(12) United States Patent
Barsness et al.

(10) Patent No.: US 9,268,614 B2
(45) Date of Patent: *Feb. 23, 2016

(54) CONFIGURING A PARALLEL COMPUTER BASED ON AN INTERLEAVE RATE OF AN APPLICATION CONTAINING SERIAL AND PARALLEL SEGMENTS

(75) Inventors: Eric L. Barsness, Pine Island, MN (US); David L. Darrington, Rochester, MN (US); Amanda Peters, Cambridge, MA (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 385 days.

This patent is subject to a terminal disclaimer.

(21) Appl. No.: 13/426,920

(22) Filed: Mar. 22, 2012

(65) Prior Publication Data

US 2012/0180058 A1    Jul. 12, 2012

Related U.S. Application Data

(63) Continuation of application No. 12/109,259, filed on Apr. 24, 2008, now Pat. No. 8,161,483.

(51) Int. Cl.
| | |
|---|---|
| G06F 9/46 | (2006.01) |
| G06F 9/50 | (2006.01) |
| G06F 9/44 | (2006.01) |
| G06F 9/445 | (2006.01) |

(52) U.S. Cl.
CPC ............ *G06F 9/5066* (2013.01); *G06F 9/4405* (2013.01); *G06F 8/60* (2013.01)

(58) Field of Classification Search
None
See application file for complete search history.

(56) References Cited

U.S. PATENT DOCUMENTS

| | | | |
|---|---|---|---|
| 5,978,830 | A | 11/1999 | Nakaya et al. |
| 6,842,759 | B2 | 1/2005 | Haggar et al. |
| 7,568,190 | B2 | 7/2009 | Creamer et al. |
| 7,703,089 | B2 | 4/2010 | Birenheide |
| 2003/0120776 | A1 | 6/2003 | Avvari et al. |
| 2004/0123278 | A1 | 6/2004 | Nanja et al. |
| 2004/0154016 | A1 | 8/2004 | Randall |
| 2005/0005200 | A1 | 1/2005 | Matena et al. |
| 2006/0070051 | A1 | 3/2006 | Kuck et al. |
| 2006/0085785 | A1 | 4/2006 | Garrett |

(Continued)

OTHER PUBLICATIONS

S.A. Jarvis, J.M.D. Hill, C.J. Siniolakis, V.P. Vasilev. "Portable and architecture independent parallel performance tuning using BSP" Parallel Computing 28 (2002) 1587-1609.*

(Continued)

*Primary Examiner* — Jacob A Petranek

(74) *Attorney, Agent, or Firm* — Edward J. Lenart; Grant A. Johnson; Kennedy Lenart Spraggins LLP

(57) ABSTRACT

Methods, systems, and products are disclosed for configuring an application for execution on a parallel computer that include: booting up a first subset of a plurality of nodes in a serial processing mode; booting up a second subset of the plurality of nodes in a parallel processing mode; profiling, prior to application deployment on the parallel computer, the application to identify the serial segments and the parallel segments of the application; and deploying the application for execution on the parallel computer in dependence upon the profile of the application and proximity within the data communications network of the nodes in the first subset relative to the nodes in the second subset.

18 Claims, 8 Drawing Sheets

(56) References Cited

U.S. PATENT DOCUMENTS

| | | | |
|---|---|---|---|
| 2006/0150190 | A1 | 7/2006 | Gusler et al. |
| 2006/0195559 | A1 | 8/2006 | Winter et al. |
| 2006/0271395 | A1 | 11/2006 | Harris et al. |
| 2007/0130566 | A1 | 6/2007 | Van Rietschote et al. |
| 2007/0180083 | A1* | 8/2007 | Adam ................ G06F 9/5066 709/223 |
| 2008/0034365 | A1 | 2/2008 | Dahlestedt |
| 2008/0209434 | A1 | 8/2008 | Queck et al. |
| 2008/0288746 | A1 | 11/2008 | Inglett et al. |
| 2009/0067334 | A1 | 3/2009 | Archer et al. |
| 2009/0119481 | A1 | 5/2009 | Vishkin |
| 2009/0172623 | A1 | 7/2009 | Cross et al. |
| 2009/0204789 | A1* | 8/2009 | Gooding ............. G06F 9/5066 712/28 |
| 2009/0240930 | A1 | 9/2009 | Barsness et al. |
| 2009/0271595 | A1 | 10/2009 | Barsness et al. |
| 2009/0271596 | A1 | 10/2009 | Barsness et al. |
| 2009/0271784 | A1 | 10/2009 | Barsness et al. |
| 2009/0271799 | A1 | 10/2009 | Barsness et al. |
| 2009/0313636 | A1 | 12/2009 | Barsness et al. |
| 2012/0192193 | A1 | 7/2012 | Barsness et al. |
| 2012/0210330 | A1 | 8/2012 | Barsness et al. |

OTHER PUBLICATIONS

Bokhari, "Dual processor scheduling with dynamic reassignment," IEEE Trans. Software Eng., vol. SE-5, pp. 341-349, Jul. 1979.
Advisory Action, U.S. Appl. No. 12/053,685, Mar. 21, 2012.
RCE, U.S. Appl. No. 12/053,685, Apr. 5, 2012.
Office Action, U.S. Appl. No. 12/053,685, Feb. 21, 2013.
Final Office Action, U.S. Appl. No. 12/140,023, Jun. 22, 2012.
Advisory Action, U.S. Appl. No. 12/140,023, Sep. 19, 2012.
Office Action, U.S. Appl. No. 13/440,065, Aug. 23, 2012.
Bokhari, "Partitioning Problems in Parallel, Pipelined, and Distributed Computing", IEEE Transactions on Computers, Jan. 1988, pp. 48-57, vol. 37, No. 1. IEEE USA.
Gibbons, "A Historical Application Profiler for Use by Parallel Schedulers", Job Scheduling Strategies for Parallel Processing, Apr. 1997, pp. 58-77, Springer-Verlag USA.
Zhu et al., "Lightweight Transparent Java Thread Migration for Distributed JVM", International Conference on Parallel Processing, Oct. 2003, pp. 465-472, IEEE USA.
Office Action, U.S. Appl. No. 12/053,685, Jul. 20, 2011, pp. 1-10.
Final Office Action, U.S. Appl. No. 12/053,685, Jan. 12, 2012, pp. 1-13.
Office Action, U.S. Appl. No. 12/109,259, Aug. 4, 2011, pp. 1-12.
Notice of Allowance, U.S. Appl. No. 12/109,259, Dec. 13, 2011, pp. 1-09.
Office Action, U.S. Appl. No. 12/109,267, Jul. 28, 2011, pp. 1-13.
Notice of Allowance, U.S. Appl. No. 12/109,267, Jan. 20, 2012, pp. 1-10.
Office Action, U.S. Appl. No. 12/140,023, Mar. 1, 2012, pp. 1-11.
Office Action, U.S. Appl. No. 12/109,248, Oct. 14, 2011, pp. 1-10.
Office Action, U.S. Appl. No. 12/109,238, Jul. 19, 2011, pp. 1-16.
Final Office Action, U.S. Appl. No. 12/109,238, Nov. 17, 2011, pp. 1-13.
Bokhari, "Dual Processor Scheduling with Dynamic Reassignment", IEEE Transactions on Software Engineering, vol. SE-5, Issue 4, Jul. 1979, pp. 341-349, Institute of Electrical and Electronics Engineers (IEEE) Xplore Digital Library, USA, DOI: 10.1109/TSE.1979.234201.
Becchi et al., "Dynamic Thread Assignment on Heterogeneous Multiprocessor Architectures", Proceedings of the 3rd Conference on Computing Frontiers (CF'06), May 2006, pp. 29-40, ACM New York, USA, DOI: 10.1145/1128022.1128029.
Final Office Action, U.S. Appl. No. 13/440,065, Feb. 22, 2013, pp. 1-08.
Office Action, U.S. Appl. No. 13/443,606, Sep. 7, 2012, pp. 1-15.
Office Action, U.S. Appl. No. 12/053,685, Dec. 17, 2013, pp. 1-13.

* cited by examiner

CONFIGURING A PARALLEL COMPUTER BASED ON AN INTERLEAVE RATE OF AN APPLICATION CONTAINING SERIAL AND PARALLEL SEGMENTS

CROSS-REFERENCE TO RELATED APPLICATION

This application is a continuation application of and claims priority from U.S. patent application Ser. No. 12/109,259, filed on Apr. 24, 2008.

BACKGROUND OF THE INVENTION

1. Field of the Invention

The field of the invention is data processing, or, more specifically, methods, apparatus, and products for configuring an application for execution on a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network generally supports point-to-point communications. A tree network, however, typically only supports communications where data from one compute node migrates through tiers of the tree network to a root compute node or where data is multicast from the root to all of the other compute nodes in the tree network. In such a manner, the tree network lends itself to collective operations such as, for example, reduction operations or broadcast operations. In the current art, however, the tree network does not lend itself to and is typically inefficient for point-to-point operations. Although in general the torus network and the tree network are each optimized for certain communications patterns, those communications patterns may be supported by either network.

Many parallel computers consist of compute nodes that each only supports a single thread. Such parallel computers are sufficient for processing a parallel application in which the application consists of instructions that are only executed serially on each compute node using a single thread. To further enhance performance, however, more robust parallel computers include compute nodes that each supports multiple threads using a multi-processor architecture. Using these more robust parallel computers, software engineers have developed parallel applications in which each application consists of segments of instructions that are only executed serially on each node using a single thread and other segments that may be executed in parallel on each node using multiple threads. That is, each compute node utilizes a single processor while executing the serial code segments and spawns threads to the other processors on that node while executing the parallel code segments. The drawback to executing multi-threaded parallel applications on these more robust parallel computers in such a manner is that computing resources are being underutilized when the compute nodes are executing the serial code segments. As mentioned above, when the compute nodes are executing the serial code segments, each compute node is processing only a single thread, and thereby only utilizing a single processor in its multi-processor architecture.

SUMMARY OF THE INVENTION

Methods, systems, and products are disclosed for configuring an application for execution on a parallel computer. The parallel computer includes a plurality of compute nodes connected together through a data communications network. Each compute node has a plurality of processors capable of operating independently for serial processing among the processors and capable of operating symmetrically for parallel processing among the processors. The application has parallel segments designated for parallel processing and serial segments designated for serial processing. Configuring an application for execution on a parallel computer includes: booting up a first subset of the plurality of compute nodes in a serial processing mode; booting up a second subset of the plurality of compute nodes in a parallel processing mode; profiling, prior to application deployment on the parallel computer, the application to identify the serial segments and the parallel segments of the application; and deploying the application for execution on the parallel computer in dependence upon the profile of the application and proximity within the data communications network of the compute nodes in the first subset relative to the compute nodes in the second subset.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
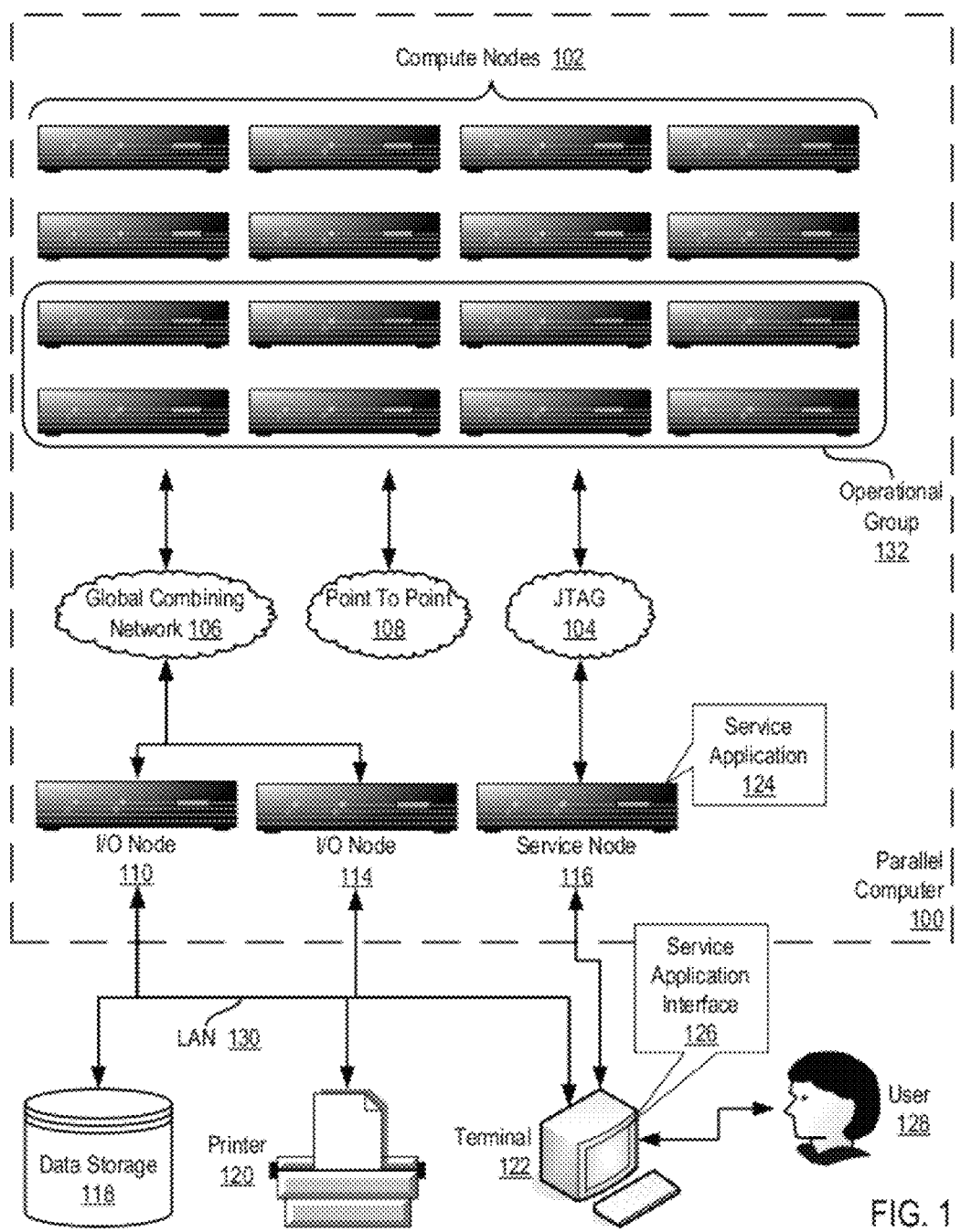
FIG. 1 illustrates an exemplary parallel computer for configuring an application for execution on a parallel computer according to embodiments of the present invention.

Exemplary methods, apparatus, and computer program products for configuring an application for execution on a parallel computer according to embodiments of the present invention are described with reference to the accompanying drawings, beginning with FIG. 1. FIG. 1 illustrates an exemplary parallel computer for configuring an application for execution on a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

Each compute node (102) includes a plurality of processors for use in executing an application on the parallel computer (100) according to embodiments of the present invention. The processors of each compute node (102) in FIG. 1 are operatively coupled to computer memory such as, for example, random access memory ('RAM'). Each compute node (102) may operate in several distinct modes that affect the relationship among the processors and the memory on that node such as, for example, serial processing mode and parallel processing mode. The mode in which the compute nodes operate is generally set during the node's boot process and does not change until the node reboots.

In a serial processing mode, often referred to a 'virtual node mode,' the processors of a compute node operate independently of one another, and each processor has access to a partition of the node's memory that is exclusively dedicated to that processor. For example, if a compute node has four processors and two Gigabytes (GB) of RAM, when operating in serial processing mode, each processor may process a thread independently of the other processors on that node, and each processor may access a portion of that node's 2GB of RAM.

In a parallel processing mode, often referred to as 'symmetric multiprocessing mode,' one of the processors acts as a master, and the remaining processors serve as slaves to the master processor. Each processor has access to the full range of computer memory on the compute node. Continuing with the exemplary node above having four processors and 2GB of RAM, for example, each slave processor may cooperatively process threads spawned from the master processor, and all of the processors have access to the node's entire 2GB of RAM.

In the parallel computer (100) of FIG. 1, the compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with network links among the compute nodes (102). The network links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is typically referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the various processes running on the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

MPI_MAX maximum
MPI_MIN minimum
MPI_SUM sum
MPI_PROD product
MPI_LAND logical and
MPI_BAND bitwise and
MPI_LOR logical or
MPI_BOR bitwise or
MPI_LXOR logical exclusive or
MPI_BXOR bitwise exclusive or As mentioned above, most collective operation communications patterns build off of these basic collective operations. One such communications pattern is a gossiping communications pattern in which one set of compute nodes communicates with another set of compute nodes. The two sets of nodes participating in the gossip communications pattern could be the same or different. Examples of gossiping communications patterns implemented using MPI may include an all-to-all operation, an all-to-ally operation, an allgather operation, an allgathery operation, and so on.

In addition to compute nodes, the parallel computer (100) includes input/output ('I/O') nodes (110, 114) coupled to compute nodes (102) through the global combining network (106). The I/O nodes (110, 114) provide I/O services between compute nodes (102) and I/O devices (118, 120, 122). I/O nodes (110, 114) are connected for data communications I/O devices (118, 120, 122) through local area network ('LAN') (130) implemented using high-speed Ethernet. The parallel computer (100) also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the service node (116) of FIG. 1 in the parallel computer (100) operates generally for configuring an application for execution on a parallel computer according to embodiments of the present invention. The application is computer software having parallel segments designated for parallel processing on each compute node and serial segments designated for serial processing on each compute node. The service node (116) of FIG. 1 operates generally for configuring an application for execution on a parallel computer according to embodiments of the present invention by: booting up a first subset of the plurality of compute nodes (102) in a serial processing mode; booting up a second subset of the plurality of compute nodes (102) in a parallel processing mode; profiling, prior to application deployment on the parallel computer (100), the application to identify the serial segments and the parallel segments of the application; and deploying the application for execution on the parallel computer (100) in dependence upon the profile of the application and proximity within the data communications network of the compute nodes (102) in the first subset relative to the compute nodes in the second subset.

Readers will note that the term 'booting' as applied to compute nodes generally refers to the process of initializing compute node components to prepare the compute node for executing application layer software. Such booting may occur when power is first applied to each compute node, when power is cycled to each compute node, or when certain reset values are written to component registers. The process of booting a compute node may include loading system layer software such as an operating system to provide an interface through which application layer software may access the node's hardware. Such system layer software however may be quite lightweight by comparison with system layer software of general purpose computers. That is, such system layer software may be a pared down version as it were of system layer software developed for general purpose computers.

The arrangement of nodes, networks, and I/O devices making up the exemplary system illustrated in FIG. 1 are for explanation only, not for limitation of the present invention. Data processing systems capable of configuring an application for execution on a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of determining when a set of compute nodes participating in a barrier operation are ready to exit the barrier operation according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Configuring an application for execution on a parallel computer according to embodiments of the present invention may be generally implemented on a parallel computer that includes a plurality of compute nodes. In fact, such computers may include thousands of such compute nodes. Each compute node is in turn itself a kind of computer composed of a plurality of computer processors (or processing cores), its own computer memory, and its own input/output adapters. For further explanation, therefore, FIG. 2 sets forth a block diagram of an exemplary compute node useful in a parallel computer capable of configuring an application for execution on a parallel computer according to embodiments of the present invention. The compute node (152) of FIG. 2 includes a plurality of processors (164) as well as random access memory ('RAM') (156). The processors (164) are connected to RAM (156) through a high-speed memory bus (154) and through a bus adapter (194) and an extension bus (168) to other components of the compute node (152).

Stored in RAM (156) is an application program (158), a module of computer program instructions that carries out parallel, user-level data processing using parallel algorithms. The application (158) of FIG. 2 has both parallel segments designated for parallel processing on each compute node and serial segments designated for serial processing on each compute node. The serial segments are portions of the application (158) that include computer program instructions for execution serially in a single thread on the compute node. The parallel segments are portions of the application (158) that include computer program instructions for execution in parallel on the compute node using multiple threads—typically one thread per processor (164).

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is a multi-processing module (161), a library of computer program instructions that carry out shared memory multi-processing among the plurality of processors (164) on the compute node (152). Application program (158) executes shared memory multi-processing operations using the functionality provided by the multi-processing module (161). The multi-processing module (161) may implement functionality specified in various shared memory multi-processing platforms such as, for example, the OpenMP™ shared memory multi-processing platform. Although illustrated in FIG. 2 as a separate component, readers will recognize that the multi-processing module (161) of FIG. 2 may be implemented as a component of an operating system.

Also stored in RAM (156) is an operating system (162), a module of computer program instructions and routines for an application program's access to other resources of the compute node. The operating system (162) may be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
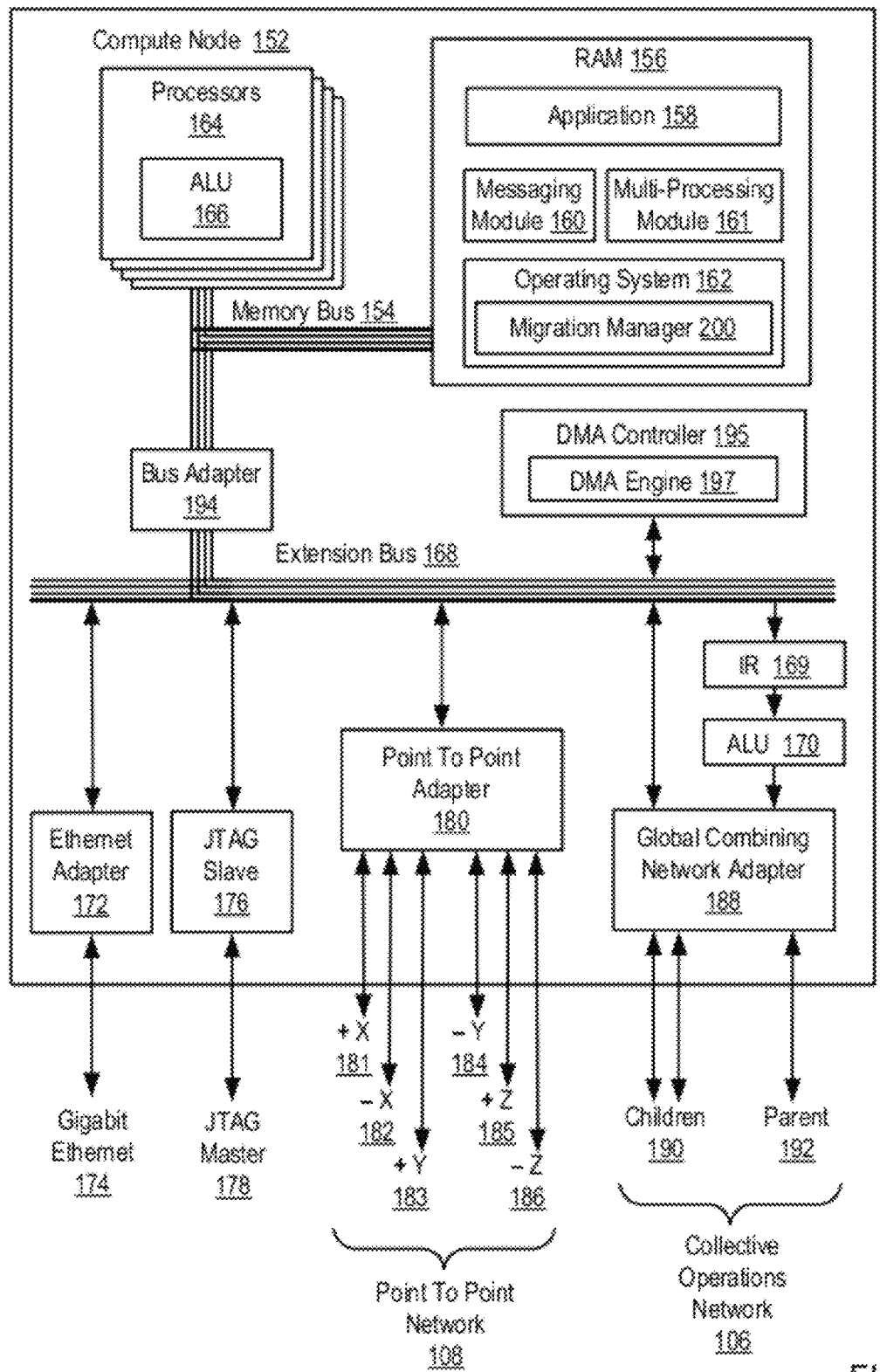
FIG. 2 sets forth a block diagram of an exemplary compute node useful in a parallel computer capable of configuring an application for execution on a parallel computer according to embodiments of the present invention.

Although the operating system (162) generally controls execution of the application (158) in the example of FIG. 2, the operating system (162) also includes a migration manager (200), which is a set of computer program instructions for migrating the application (158) from one compute node to another based on the segments of the application (158). The migration manager (200) may communicate with the migration manager on other compute nodes and with the service node to determine whether the application (158) should be migrated to another node, the node to which the migration manager (200) should migrate the application (158), the extent of the migration, and so on.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus (USW), through data communications networks such as IP networks, and in other ways as will occur to those of skill in the art. Communications adapters implement the hardware level of data communications through which one computer sends data communications to another computer, directly or through a network. Examples of communications adapters useful in systems for configuring an application for execution on a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in configuring an application for execution on a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access (DMA') controller (195), which is computer hardware for direct memory access and a DMA engine (197), which is computer software for direct memory access. In the example of FIG. 2, the DMA engine (197) is configured in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

The exemplary compute node (152) of FIG. 2 is included in a parallel computer that operates generally for configuring the application (158) for execution on a parallel computer according to embodiments of the present invention. Such a parallel computer operates generally for configuring the application (158) for execution on a parallel computer according to embodiments of the present invention by: booting up a first subset of the plurality of compute nodes in a serial processing mode; booting up a second subset of the plurality of compute nodes in a parallel processing mode; profiling, prior to application deployment on the parallel computer, the application to identify the serial segments and the parallel segments of the application; and deploying the application for execution on the parallel computer in dependence upon the profile of the application and proximity within the data communications network of the compute nodes in the first subset relative to the compute nodes in the second subset.

Figure 3A:
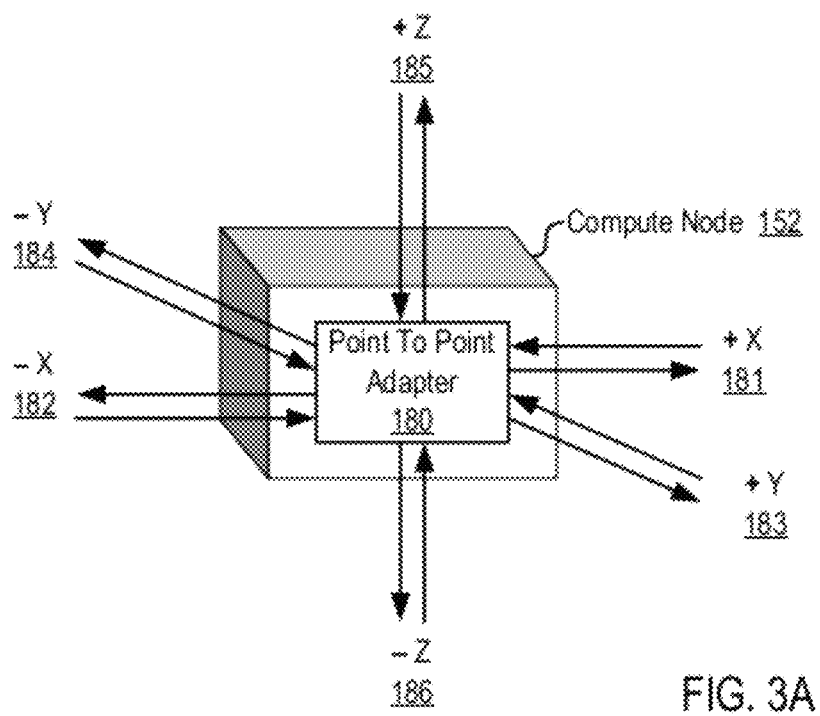
FIG. 3A illustrates an exemplary Point To Point Adapter useful in a parallel computer capable of configuring an application for execution on a parallel computer according to embodiments of the present invention.

For further explanation, FIG. 3A illustrates an exemplary Point To Point Adapter (180) useful in a parallel computer capable of configuring an application for execution on a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
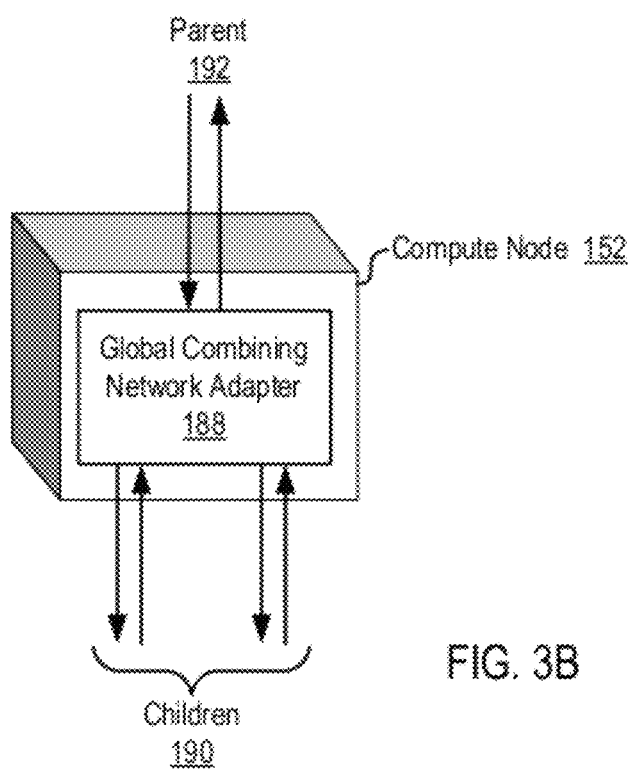
FIG. 3B illustrates an exemplary Global Combining Network Adapter useful in a parallel computer capable of configuring an application for execution on a parallel computer according to embodiments of the present invention.

For further explanation, FIG. 3B illustrates an exemplary Global Combining Network Adapter (188) useful in a parallel computer capable of broadcasting collective operation contributions throughout the parallel computer according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes (190) through two links. Each link to each child node (190) is formed from two unidirectional data communications paths. Global Combining Network Adapter (188) also provides data communication to and from a parent node (192) through a link formed from two unidirectional data communications paths.

Figure 4:
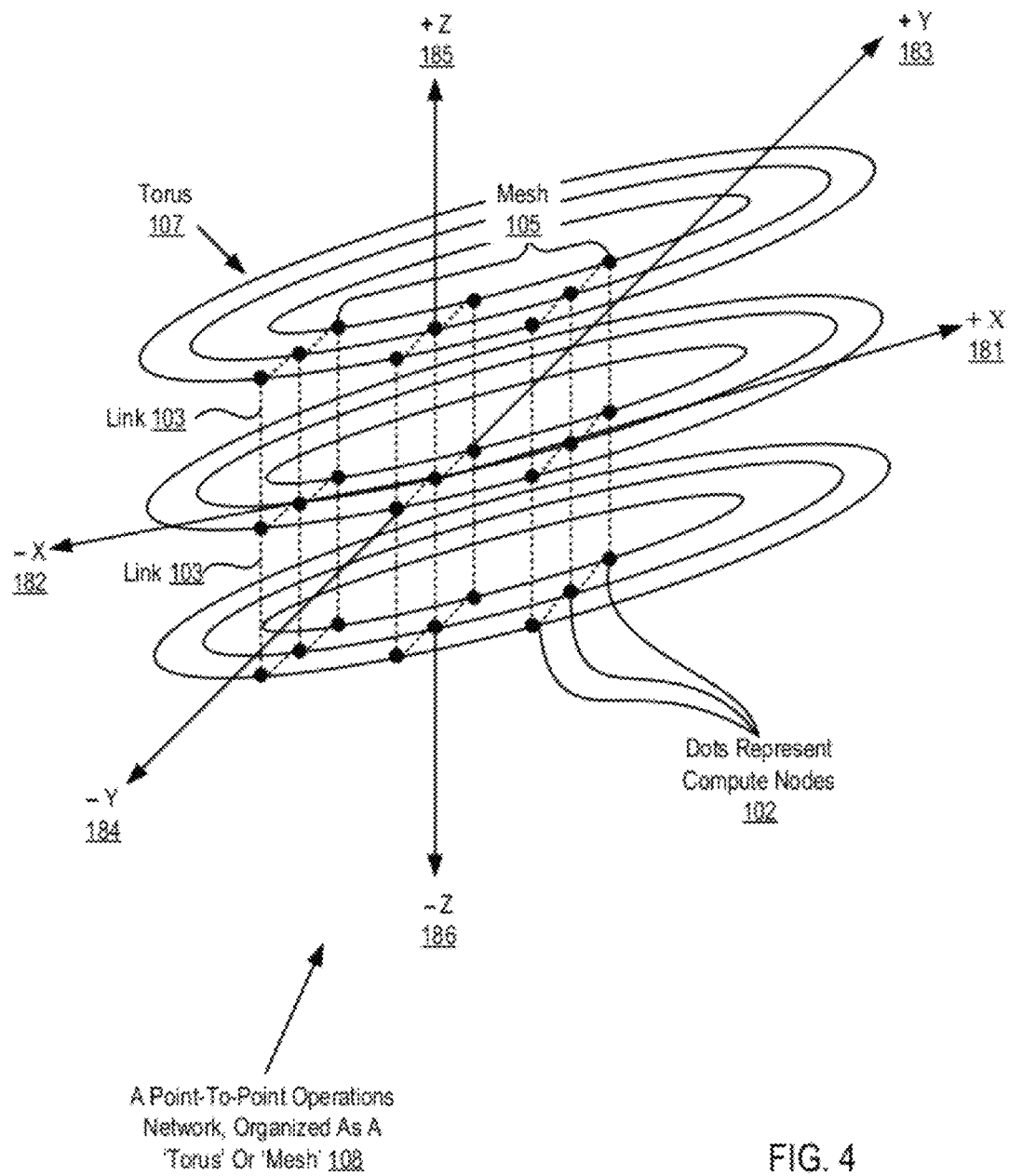
FIG. 4 sets forth a line drawing illustrating an exemplary data communications network optimized for point to point operations useful in a parallel computer capable of configuring an application for execution on a parallel computer according to embodiments of the present invention.

For further explanation, FIG. 4 sets forth a line drawing illustrating an exemplary data communications network (108) optimized for point to point operations useful in a parallel computer capable of configuring an application for execution on a parallel computer in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and from in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in configuring an application for execution on a parallel computer in accordance with embodiments of the present invention may contain only a few compute nodes or may contain thousands of compute nodes.

Figure 5:
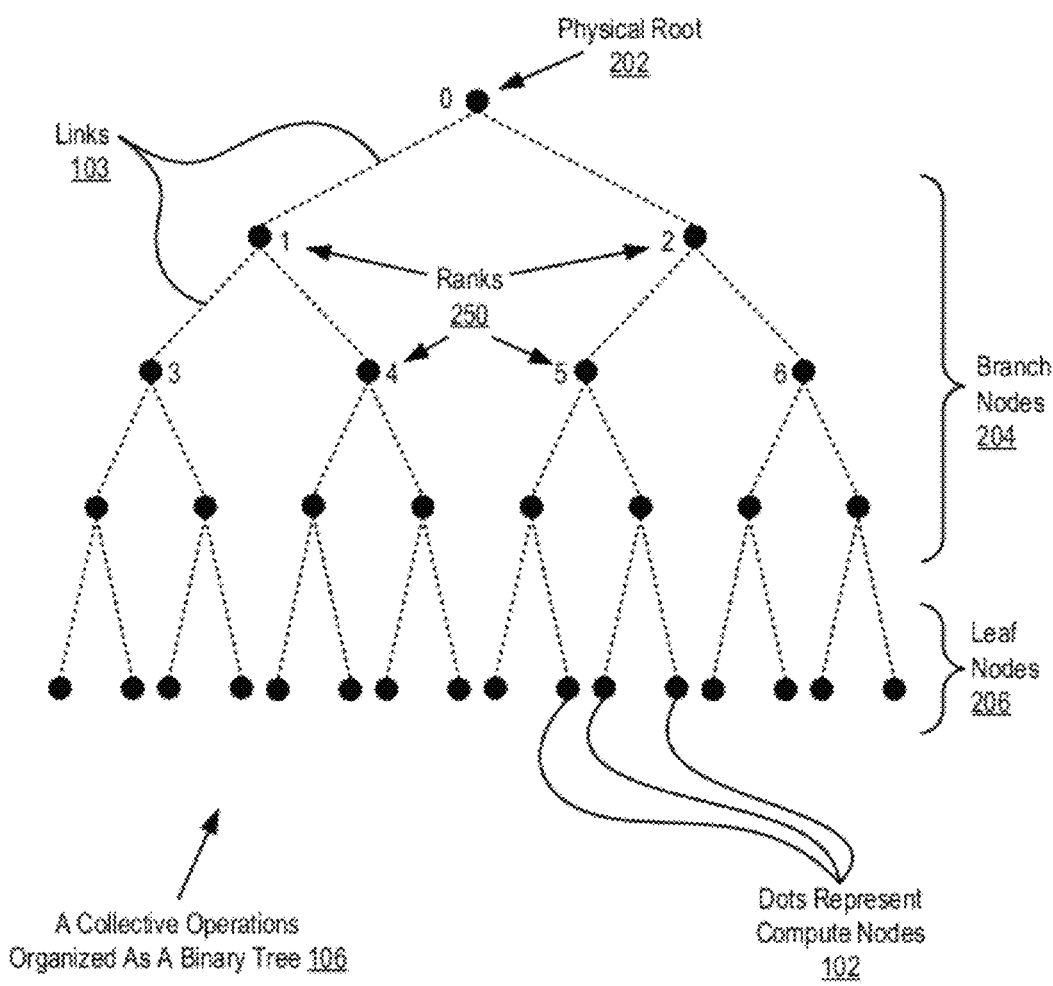
FIG. 5 sets forth a line drawing illustrating an exemplary data communications network optimized for collective operations useful in a parallel computer capable of configuring an application for execution on a parallel computer according to embodiments of the present invention.

For further explanation, FIG. 5 sets forth a line drawing illustrating an exemplary data communications network (106) optimized for collective operations useful in a parallel computer capable of configuring an application for execution on a parallel computer in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in a parallel computer for configuring an application for execution on a parallel computer in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
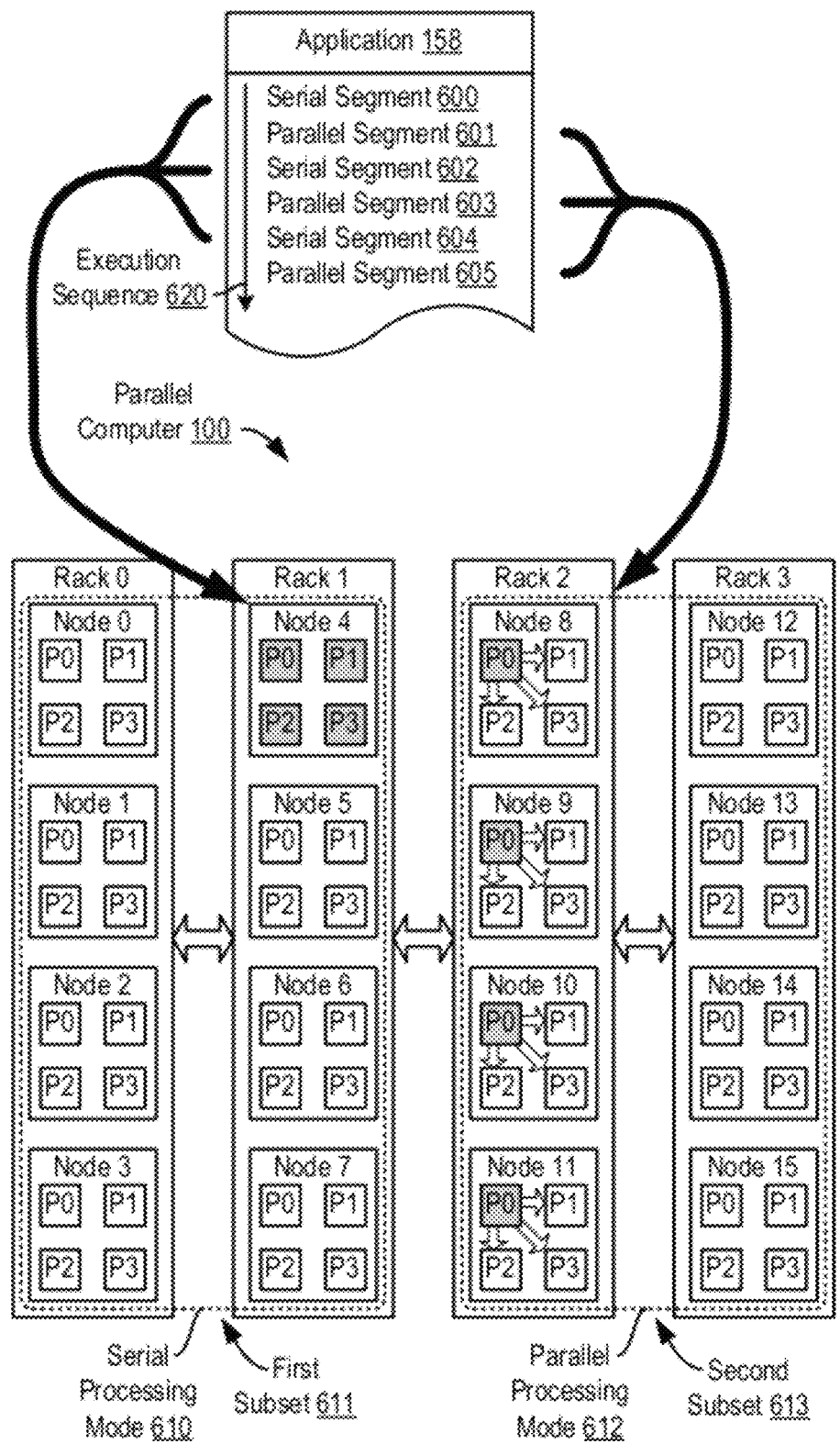
FIG. 6 sets forth a line drawing illustrating an exemplary parallel computer on which an application is configured for execution according to embodiments of the present invention.

For further explanation, FIG. 6 sets forth a line drawing illustrating an exemplary parallel computer (100) on which an application (158) is configured for execution according to embodiments of the present invention. The parallel computer (100) of FIG. 6 includes sixteen compute nodes labeled 0-15 and connected together through a data communications network. The compute nodes are spread across four racks labeled 0-3. Rack 0 includes nodes 0-3, rack 1 includes nodes 4-7, rack 2 includes 8-11, and rack 3 includes nodes 12-15. Due to the physical links in the data communications network connecting the nodes in each rack 0-3, the nodes in rack 0 are directly connected to the nodes in rack 1, the nodes in rack 1 are directly connected to the nodes in rack 2, and the nodes in rack 2 are directly connected to the nodes in rack 3. All other data communication connections between racks 0-3 are indirect and require traversal of an intervening rack. For example, data communications between the nodes in rack 0 and the nodes in rack 2 must pass through rack 1 in the example of FIG. 6. Readers will note, however, that the network topology of the nodes in the example of FIG. 6 is for explanation only and not for limitation. Other topologies as will occur to those of skill in the art may also be useful according to embodiments of the present invention.

Each compute node 0-15 has four processors, or processing cores, labeled P0, P1, P2, and P3. The processors of each compute node 0-15 are capable of operating independently for serial processing among the processors P0-P3 and capable of operating symmetrically for parallel processing among the processors P0-P3. In the example of FIG. 6, a service node (not shown) boots up a first subset (611) of nodes that includes nodes 0-7 of racks 0-1 in a serial processing mode (610). The service node also boots up a second subset (613) of nodes that includes nodes 8-15 of racks 2-3 in a parallel processing mode (612).

In the example of FIG. 6, the parallel computer (100) executes an application (158) on the computer's compute nodes. The application (158) of FIG. 6 has both parallel segments (601, 603, 605) designated for parallel processing and serial segments (600, 602, 604) designated for serial processing. The serial segments (600, 602, 604) include computer program instructions for execution serially in a single thread, while the parallel segments (601, 603, 605) includes computer program instructions for execution among multiple threads in parallel. The application (158) of FIG. 6 may distinguish the serial segments (600, 602, 604) from the parallel segment (601, 603, 605) in the application (158) using the programming directive '#pragma omp parallel {...}' for each parallel segment (601, 603, 605) such that the computer program instructions of each parallel segment (601, 603, 605) are placed in the curly braces of the directive. Readers will note that such an exemplary directive is for explanation only and not for limitation. In fact, the serial segments (600, 602, 604) may be distinguished from the parallel segment (601, 603, 605) in many other ways as will occur to those of skill in the art such as, for example, processor operation codes, historical execution information, and so on.

In the example of FIG. 6, the service node profiles the application (158) to identify the serial segments (600, 602, 604) and the parallel segments (601, 603, 605) of the application (158) prior to application deployment on the parallel computer (100). The service node may profile the application (158) by parsing application instructions of the application (158) for serial segments (600, 602, 604) and parallel segments (601, 603, 605). That is, the service node may examine the application (158) for directives such as '#pragma omp parallel' or special processor operation codes specifying that a particular segment of application instructions is designated for serial processing or parallel processing. In some other embodiments, the service node may profile the application (158) by identifying the serial segments (600, 602, 604) and the parallel segments (601, 603, 605) of the application (158) in dependence upon historical execution information. Regardless of the manner in which the application's serial segments (600, 602, 604) and application's parallel segments (601, 603, 605) are identified, the service node uses the application's profile to deploy the application (158) for execution on the parallel computer (100).

In the example of FIG. 6, the distribution of the serial segments (600, 602, 604) and the parallel segments (601, 603, 605) along the application's execution sequence (620) is described by an interleave rate for the application (158). That is, the interleave rate describes the frequency with which segments designated for serial processing and segments designated for parallel processing alternate during the application's execution sequence (620). Readers will note that the interleave rate between the serial segments (600, 602, 604) and the parallel segments (601, 603, 605) of the application (158) is high. Because the application's serial segment (600, 602, 604) are executed on nodes booted up in serial processing mode (610) and the application's parallel segments (601, 603, 605) are executed on nodes booted up in parallel processing mode (612), the parallel computer (100) will have to frequently migrate the application (158) of FIG. 6 between the nodes booted up in serial processing mode (610) and the nodes booted up in parallel processing mode (612).

In the example of FIG. 6, a service node deploys the application (158) for execution on the parallel computer (100) based on the application's profile, which identifies serial segments (600, 602, 604) and parallel segments (601, 603, 605), and based on the proximity within the data communications network of the compute nodes 0-7 in the first subset (611) relative to the compute nodes 8-15 in the second subset (613). The service node may utilize the application's profile to determine that the interleave rate for the application (158) illustrated in FIG. 6 is high, thereby indicating that the application will require frequent migration between nodes booted up in serial processing mode and nodes booted up in parallel processing mode. Because the parallel computer (100) will likely migrate the application (158) frequently during execution, the service node selects particular compute nodes in the first subset (611) to process the application's serial segments and particular compute nodes in the second subset (613) to process the application's parallel segments such that the selected compute nodes have predefined locations in the data communications network to increase the proximity of the selected compute nodes in the first subset (611) and the selected compute nodes in the second subset (613). In the example of FIG. 6, the compute nodes in the first subset (611) and the second subset (613) at locations in the network to increase proximity are the compute nodes 4-7 in rack 1 and compute nodes 8-11 in rack 2. As such, the service node selects compute nodes in rack 1 and rack 2 for processing segments the application (158).

For discussion purposes with respect to FIG. 6, let us consider that an application developer or a system administrator has decided that four instances of the application (158) will be executed on the parallel computer (100). That is, four instances of the application (158) will be processed concurrently using four processors of the parallel computer (100). Accordingly, the serial segments (600, 602, 604) of the application (158) will be executed using a minimum of four threads. That is, during serial segments, the parallel computer (100) will process four instances of the application (158), each instance utilizing a single thread of execution. Additional threads, however, may be utilized during parallel segments (601, 603, 605) of the application (158) as each of those four initial threads spawn threads for enhanced performance during those parallel segments (601, 603, 605). From the above description, readers will note that during serial segments of the application a certain level of parallel processing is being performed, but during the parallel segments of the application where additional threads are spawned, an even greater level of parallel processing may be utilized to enhance performance.

Because the application (158) begins with a serial segment (600), a service node initially configures four instances of the application (158) on four processors on a single compute nodes booted up in serial processing mode (610). Specifically, the service node configures the application (158) on each processor P0-P3 of compute node 4 in rack 1 as indicated by the shading of each of those processors. Because each instance of the application (158) only uses one thread during the serial segments (600, 602, 604), the application (158) only uses four processing cores for execution, those four processing cores processing the four instances independently of one another. Readers will note that because all processors P0-P3 on compute node 4 are utilized for processing the serial segment (600), the processing resources of the compute node 4 are not squandered.

While all of the processors P0-P3 of compute node 4 are being utilized for execution of the application (158), no additional processors are available on node 4 to process threads spawned when a parallel segment (601, 603, 605) of the application (158) is encountered. Upon encountering the parallel segment (601, 603, 605) during the application's execution sequence (620), therefore the parallel computer (100) migrates the application (158) to the compute nodes of rack 2 booted up in a parallel processing mode (612). Specifically in the example of FIG. 6, the following migration occurs: the application instance on P0 of node 4 is migrated to P0 of node 8; the application instance on P1 of node 4 is migrated to P0 of node 9; the application instance on P2 of node 4 is migrated to P0 of node 10; and the application instance on P3 of node 4 is migrated to P0 of node 11. Again, readers will recall that the application is migrated to the adjacent nodes in the data communications network because of the high interleave rate between the application's serial segments and parallel segments. Because nodes 8-11 are booted in parallel processing mode (612), P0 serves as a master processor and the remaining processors P1-3 serve as slave processors to P0. During execution of the parallel segment (601) of FIG. 6, therefore, each application instance on P0 of nodes 8-11 may spawn threads to processors P1-3 of each node to aid in processing the parallel segment (601) as represented in FIG. 6 using arrows from P0 to P1-3 in nodes 9-11.

While all of the processors P0-3 of each compute node 8-11 are being utilized for execution of the application (158), none of the processors are underutilized because each processor executes either the main thread of an instance of the application (158) or a thread spawned from the main thread. Executing the serial segments (600, 602, 604) of the application (158) on compute node 8-11, however, would result in three processors P1-3 not being utilized. Upon encountering the serial segments (600, 602, 604) during execution sequence (620) of the application (158) in the example of FIG. 6, therefore, the parallel computer (100) migrates the application (158) to the compute node 4 booted up in the serial processing mode (610).

In the application (158) illustrated in FIG. 6, the serial segments and the parallel segments are distributed along the application's execution sequence such that the application frequently alternates those segments designated for serial processing and those segments designated for parallel processing. Accordingly, the application is deployed on compute nodes booted up in serial processing mode and compute nodes booted up in parallel processing mode that are in close proximity to one another. In many embodiments, however, an application may not frequently alternate between segments designated for serial processing and segments designated for parallel processing during the application execution sequence. For further explanation, consider FIG. 7 that sets forth a line drawing illustrating a further exemplary parallel computer on which an application is configured for execution according to embodiments of the present invention.

Figure 7:
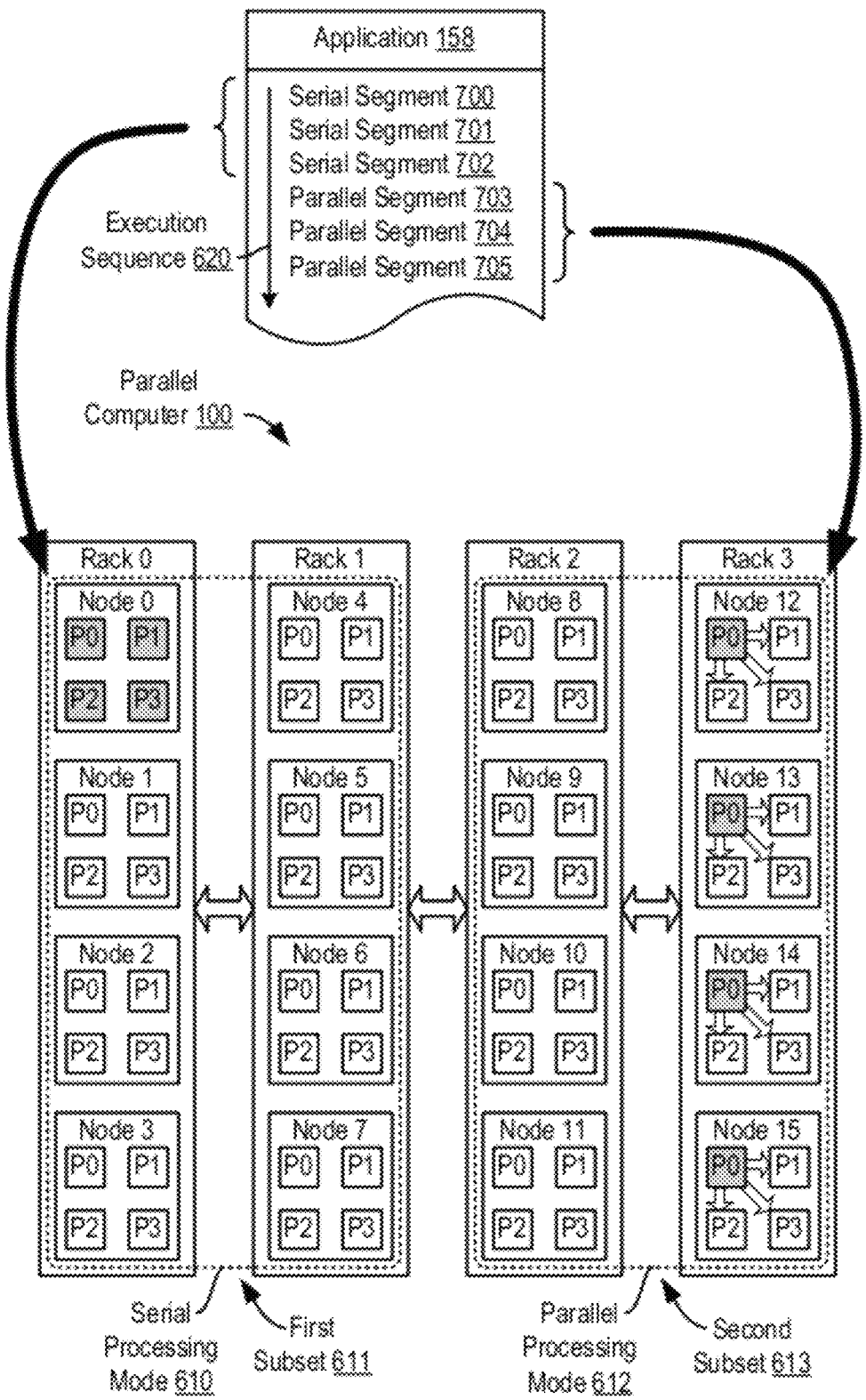
FIG. 7 sets forth a line drawing illustrating a further exemplary parallel computer on which an application is configured for execution according to embodiments of the present invention.

The parallel computer (100) of FIG. 7 includes sixteen compute nodes labeled 0-15 and connected together through a data communications network. The compute nodes are spread across four racks labeled 0-3. Rack 0 includes nodes 0-3, rack 1 includes nodes 4-7, rack 2 includes 8-11, and rack 3 includes nodes 12-15. Due to the physical links in the data communications network connecting the nodes in each rack 0-3, the nodes in rack 0 are directly connected to the nodes in rack 1, the nodes in rack 1 are directly connected to the nodes in rack 2, and the nodes in rack 2 are directly connected to the nodes in rack 3. All other data communication connections between racks 0-3 are indirect and require traversal of an intervening rack. For example, data communications between the nodes in rack 0 and the nodes in rack 2 must pass through rack 1 in the example of FIG. 7. Readers will note, however, that the network topology of the nodes in the example of FIG. 7 is for explanation only and not for limitation.

Each compute node 0-15 has four processors, or processing cores, labeled P0, P1, P2, and P3. The processors of each compute node 0-15 are capable of operating independently for serial processing among the processors P0-P3 and capable of operating symmetrically for parallel processing among the processors P0-P3. In the example of FIG. 7, a service node (not shown) boots up a first subset (611) of nodes that includes nodes 0-7 of racks 0-1 in a serial processing mode (610). The service node also boots up a second subset (613) of nodes that includes nodes 8-15 of racks 2-3 in a parallel processing mode (612).

In the example of FIG. 7, the parallel computer (100) executes an application (158) on the computer's compute nodes. The application (158) of FIG. 7 has both parallel segments (703, 704, 705) designated for parallel processing and serial segments (700, 701, 702) designated for serial processing. The serial segments (700, 701, 702) include computer program instructions for execution serially in a single thread, while the parallel segments (703, 704, 705) includes computer program instructions for execution among multiple threads in parallel. The application (158) of FIG. 7 may distinguish the serial segments (700, 701, 702) from the parallel segment (703, 704, 705) in the application (158) using the programming directive '#pragma omp parallel {. . . }' for each parallel segment (703, 704, 705) such that the computer program instructions of each parallel segment (703, 704, 705) are placed in the curly braces of the directive. Readers will note that such an exemplary directive is for explanation only and not for limitation. In fact, the serial segments (700, 701, 702) may be distinguished from the parallel segment (703, 704, 705) in many other ways as will occur to those of skill in the art such as, for example, processor operation codes, historical execution information, and so on.

In the example of FIG. 7, the service node profiles the application (158) to identify the serial segments (700, 701, 702) and the parallel segments (703, 704, 705) of the application (158) prior to application deployment on the parallel computer (100). As mentioned above, the service node may profile the application (158) by parsing application instructions of the application (158) for serial segments (700, 701, 702) and parallel segments (703, 704, 705) or by identifying the serial segments (700, 701, 702) and the parallel segments (703, 704, 705) of the application (158) in dependence upon historical execution information. Regardless of the manner in which the application's serial segments (700, 701, 702) and application's parallel segments (703, 704, 705) are identified, the service node uses the application's profile to deploy the application (158) for execution on the parallel computer (100).

Based on the application's profile, a service node of the parallel computer (100) in the example of FIG. 7 determines that the application's interleave rate between the serial segments (700, 701, 702) and the parallel segments (703, 704, 705) is low. Readers will recall from above that an application's interleave rate describes the distribution of the application's serial segments and parallel segments along the application's execution sequence (620). That is, the interleave rate describes the frequency with which segments designated for serial processing and segments designated for parallel processing alternate during the application's execution sequence (620). Even though the application's serial segment (700, 701, 702) are typically executed on nodes booted up in serial processing mode (610) and the application's parallel segments (703, 704, 705) are typically executed on nodes booted up in parallel processing mode (612), the parallel computer (100) will only have to migrate the application (158) of FIG. 7 once between the nodes booted up in serial processing mode (610) and the nodes booted up in parallel processing mode (612). Only one migration is required because only once during the execution sequence (620) does the application (158) switch from a serial segment to a parallel segment or vice versa.

In the example of FIG. 7, a service node deploys the application (158) for execution on the parallel computer (100) based on the application's profile, which identifies serial segments (700, 701, 702) and parallel segments (703, 704, 705), and based on the proximity within the data communications network of the compute nodes 0-7 in the first subset (611) relative to the compute nodes 8-15 in the second subset (613). The service node may utilize the application's profile to determine that the interleave rate for the application (158) illustrated in FIG. 7 is low, thereby indicating that the application will not require frequent migration between nodes booted up in serial processing mode and nodes booted up in parallel processing mode. Because the parallel computer (100) will not typically migrate the application (158) of FIG. 7 frequently during execution, the service node selects particular compute nodes in the first subset (611) to process the application's serial segments and particular compute nodes in the second subset (613) to process the application's parallel segments such that the selected compute nodes have predefined locations in the data communications network to reduce the proximity of the selected compute nodes in the first subset (611) and the selected compute nodes in the second subset (613). In the example of FIG. 7, the compute nodes in the first subset (611) and the second subset (613) at locations in the network to reduce proximity are the compute nodes 0-3 in rack 0 and compute nodes 12-15 in rack 3. As such, the service node selects compute nodes in rack 0 and rack 3 for processing segments the application (158).

For discussion purposes with respect to FIG. 7, let us consider that an application developer or a system administrator has decided that four instances of the application (158) will be executed on the parallel computer (100). That is, four instances of the application (158) will be processed concurrently using four processors of the parallel computer (100). Accordingly, the serial segments (700, 701, 702) of the application (158) will be executed using a minimum of four threads. That is, during serial segments, the parallel computer (100) will process four instances of the application (158), each instance utilizing a single thread of execution. Additional threads, however, may be utilized during parallel segments (703, 704, 705) of the application (158) as each of those four initial threads spawn threads for enhanced performance during those parallel segments (703, 704, 705). From the above description, readers will note that during serial segments of the application a certain level of parallel processing is being performed, but during the parallel segments of the application where additional threads are spawned, an even greater level of parallel processing may be utilized to enhance performance.

Because the application (158) begins with a serial segment (600), a service node initially configures four instances of the application (158) on four processors on a single compute nodes booted up in serial processing mode (610). Specifically, the service node configures the application (158) on each processor P0-P3 of compute node 0 in rack 0 as indicated by the shading of each of those processors. Because each instance of the application (158) only uses one thread during the serial segments (700, 701, 702), the application (158) only uses four processing cores for execution, those four processing cores processing the four instances independently of one another. Readers will note that because all processors P0-P3 on compute node 0 are utilized for processing the serial segment (700), the processing resources of the compute node 0 are not squandered.

While all of the processors P0-P3 of compute node 0 are being utilized for execution of the application (158), no additional processors are available on node 0 to process threads spawned when a parallel segment (703, 704, 705) of the application (158) is encountered. Upon encountering the parallel segment (703, 704, 705) during the application's execution sequence (620), therefore the parallel computer (100) migrates the application (158) to the compute nodes of rack 3 booted up in a parallel processing mode (612). Specifically in the example of FIG. 7, the following migration occurs: the application instance on P0 of node 0 is migrated to P0 of node 12; the application instance on P1 of node 0 is migrated to P0 of node 13; the application instance on P2 of node 0 is migrated to P0 of node 14; and the application instance on P3 of node 0 is migrated to P0 of node 15. Because nodes 12-15 are booted in parallel processing mode (612), P0 serves as a master processor and the remaining processors P1-3 serve as slave processors to P0. During execution of the parallel segments (703, 704, 705) of FIG. 7, therefore, each application instance on P0 of nodes 12-15 may spawn threads to processors P1-3 of each node to aid in processing the parallel segments (703, 704, 705) as represented in FIG. 7 using arrows from P0 to P1-3 in nodes 12-15.

Readers will note that, in the example of FIG. 7, the application (158) is migrated between nodes at disparate ends of the data communications network because of the low interleave rate between the application's serial segments and parallel segments. Migrating the application (158) of FIG. 7 between nodes at disparate ends of the data communications network because of the low interleave rate between the application's serial segments and parallel segments advantageously leaves the nodes in racks 1 and 2 available to process applications having a higher interleave rate between segments designated for serial processing and for parallel processing.

Figure 8:
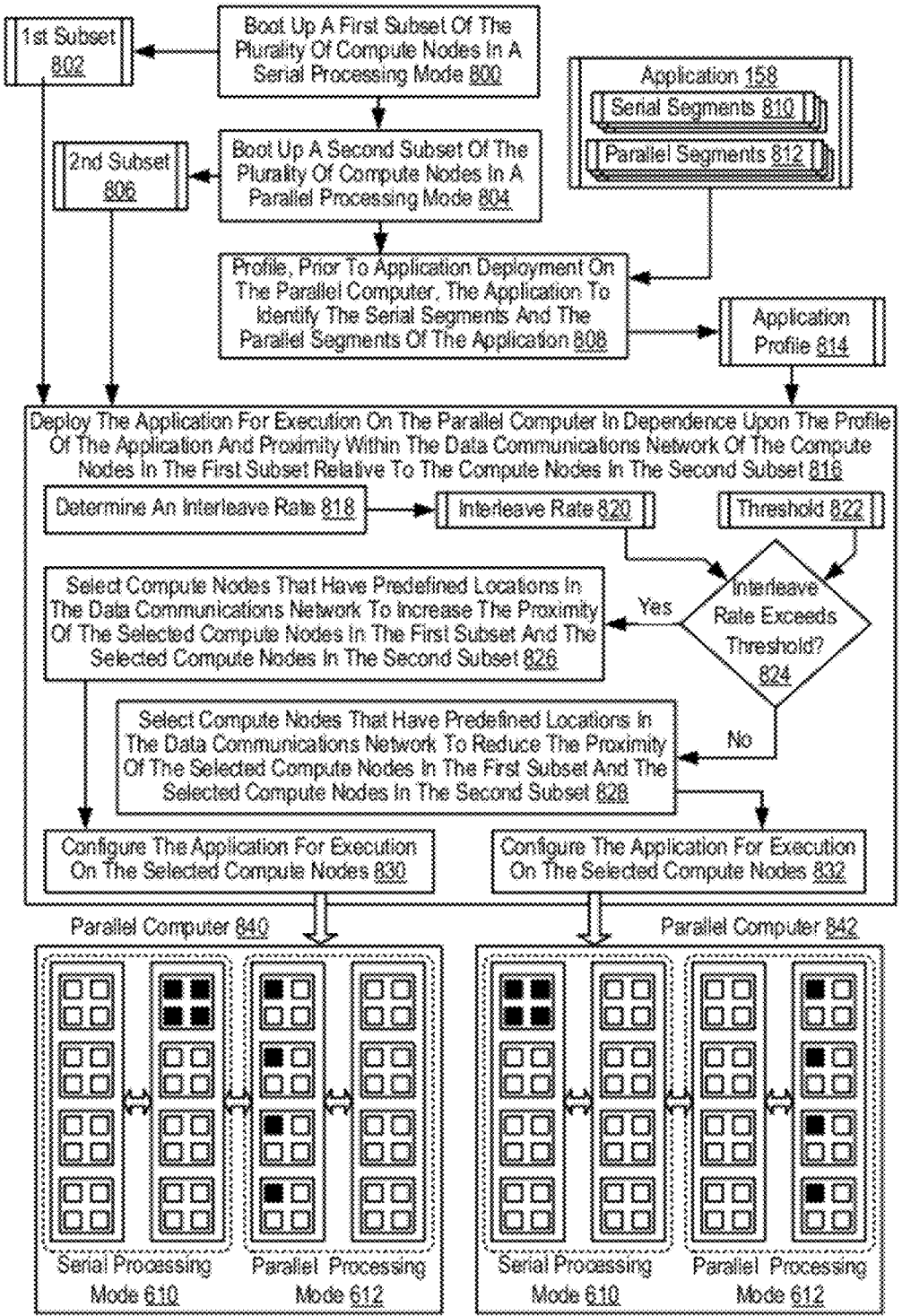
FIG. 8 sets forth a flow chart illustrating an exemplary method for configuring an application for execution on a parallel computer according to the present invention.

For further explanation, FIG. 8 sets forth a flow chart illustrating an exemplary method for configuring an application for execution on a parallel computer according to the present invention. The parallel computer described with reference to FIG. 8 includes plurality of compute nodes connected together through a data communications network. Each compute node has a plurality of processors capable of operating independently for serial processing among the processors and capable of operating symmetrically for parallel processing among the processors. The application (158) of FIG. 8 has parallel segments (812) designated for parallel processing and serial segments (810) designated for serial processing.

The method of FIG. 8 includes booting up (800) a first subset (802) of the plurality of compute nodes in a serial processing mode. Booting up (800) a first subset (802) of the plurality of compute nodes in a serial processing mode according to the method of FIG. 8 may be carried out by setting register values in processors, memory, or bus circuitry of each compute node in the first subset (802) to instruct the node to operate in a serial processing mode. The minimum number of nodes included in the first subset (802) may be determined by dividing the number of instances of the application (158) that the application developer or system administrator desires to run concurrently on the parallel computer by the number of processors on each compute node. For example, if an application developer or a system administrator desires to have the parallel computer execute sixteen instances of the application (158) concurrently and each compute node has four processors, then the first subset (802) of nodes should include at least four compute nodes. In many embodiments, however, a service node may boot all of the compute nodes included in several racks in serial processing mode to provide a group of compute nodes for processing multiple applications concurrently.

The method of FIG. 8 also includes booting up (804) a second subset (806) of the plurality of compute nodes in a parallel processing mode. Booting up (804) a second subset (806) of the plurality of compute nodes in a parallel processing mode according to the method of FIG. 8 may be carried out by setting register values in processors, memory, or bus circuitry of each compute node in the second subset (806) to instruct the node to operate in a parallel processing mode. The minimum number of nodes included in the second subset (806) may be determined to be the number of instances of the application (158) that the application developer or system administrator desires to run concurrently on the parallel computer by the number of processors on each compute node. For example, if an application developer or a system administrator desire to have the parallel computer execute sixteen instances of the application (158) concurrently, then the second subset (806) of nodes may include at least sixteen compute nodes. In many embodiments, however, a service node may boot all of the compute nodes included in several racks in parallel processing mode to provide a group of compute nodes for processing multiple applications concurrently.

The method of FIG. 8 includes profiling (808), prior to application deployment on the parallel computer, the application (158) to identify the serial segments (810) and the parallel segments (812) of the application (158). Profiling (808), prior to application deployment on the parallel computer, the application (158) to identify the serial segments (810) and the parallel segments (812) of the application (158) according to the method of FIG. 8 may be carried out by a service node for the parallel computer or one or more compute nodes. The application profile (814) of FIG. 8 is a data structure that specifies the serial segments (810) and the parallel segments (812) in the application's execution sequence. The application profile (814) may specify the serial segments (810) and the parallel segments (812) using processor instructions counter values that denote the beginning and the end of the serial segments (810) and the parallel segments (812). Readers will note, however, that such an implementation of an exemplary application profile (814) is for explanation only and not for limitation. Other implementations of an application profile as will occur to those of skill in the art may also be useful in configuring an application for execution on a parallel computer according to embodiments of the present invention.

Profiling (808), prior to application deployment on the parallel computer, the application (158) to identify the serial segments (810) and the parallel segments (812) of the application (158) according to the method of FIG. 8 may be carried out by parsing application instructions of the application (158) for serial segments (810) and parallel segments (812). For example, a OpenMP™ directive '#pragma omp parallel {. . . }' specifies that all of the instructions in the curly braces may be executed in parallel using multiple threads that shared the same memory. For another example, consider the UNIX instruction 'thr_create( )' that invokes a function to create a thread that execute concurrently with the thread calling the function.

Profiling (808), prior to application deployment on the parallel computer, the application (158) to identify the serial segments (810) and the parallel segments (812) of the application (158) according to the method of FIG. 8 may also be carried out by identifying the serial segments (810) and the parallel segments (812) of the application (158) in dependence upon historical execution information. The historical execution information may be gathered by a service node that administers the application's execution on the parallel computer. Using historical execution information, the parallel computer may determined at what points during the application's execution that the application was previously migrated between nodes booted up in serial processing mode and nodes booted up in parallel processing mode. The parallel computer may use the identified points during the application's execution that the application was previously migrated between nodes booted up in serial processing mode and nodes booted up in parallel processing mode to infer the serial segments (810) and parallel segments (812) of the application (158).

The method of FIG. 8 also includes deploying (816) the application (158) for execution on the parallel computer in dependence upon the profile (814) of the application (158) and proximity within the data communications network of the compute nodes in the first subset (802) relative to the compute nodes in the second subset (806). Deploying (816) the application (158) for execution on the parallel computer according to the method of FIG. 8 may be carried out by a service node of the parallel computer or one or more compute nodes for the parallel computer.

Deploying (816) the application (158) for execution on the parallel computer according to the method of FIG. 8 includes determining (818) an interleave rate (820) for the application (158) in dependence upon the profile (814) for the application (158). The interleave rate (820) of FIG. 8 specifies the distribution of the serial segments (810) and the parallel segments (812) along the application's execution sequence. A service node or one or more compute nodes may determine (818) an interleave rate (820) for the application (158) according to the method of FIG. 8 by calculating the number of times specified by the application profile (814) that the application's execution sequence switches between a serial segment and a parallel segment. For example, consider an application profile for an application having the following exemplary execution sequence:

serial segment
    parallel segment
    serial segment
    parallel segment
    serial segment
    parallel segment
    serial segment In the example above, the number of times that the application's execution sequence switches between a serial segment and a parallel segment is six times. The application having the exemplary execution sequence above therefore may be assigned an interleave rate of six times per execution.

For further explanation, consider an application profile for an application having the following exemplary execution sequence:

serial segment
    serial segment
    serial segment
    serial segment
    parallel segment parallel segment
parallel segment In the example above, the number of times that the application's execution sequence switches between a serial segment and a parallel segment is one time. The application having the exemplary execution sequence above therefore may be assigned an interleave rate of one time per execution.

Deploying (816) the application (158) for execution on the parallel computer according to the method of FIG. 8 also includes determining (824) whether the interleave rate (820) for the application (158) exceeds a particular threshold (822). The particular threshold (822) represents a value for interleave rates above which execution performance for an application is reduced when the nodes in serial and parallel processing mode are not in close proximity to one another in the data communications network. An application's interleave rate (820) that exceeds the threshold (822) indicates that the application migrates back and forth between nodes in serial and parallel processing mode frequently enough during execution that the overhead of migrating the application is generally only worthwhile from a performance standpoint if the application does not have to migrate very far across the network. The threshold (822) of FIG. 8 may be specific to a particular application or may be used across many applications. Moreover, the threshold (822) may be statically set by a system administrator or dynamically determined based on network performance metrics.

In the method of FIG. 8, deploying (816) the application (158) for execution on the parallel computer also includes selecting (826), if the interleave rate (820) for the application (158) exceeds the particular threshold (822), particular compute nodes in the first subset (802) to process the application's serial segments (810) and particular compute nodes in the second subset (806) to process the application's parallel segments (812) such that the selected compute nodes have predefined locations in the data communications network to increase the proximity of the selected compute nodes in the first subset (802) and the selected compute nodes in the second subset (806). Selecting (826) compute nodes in the first and second subsets (802, 806) that have predefined locations in the data communications network to increase the proximity of the selected compute nodes in the first subset (802) and the selected compute nodes in the second subset (806) according to the method of FIG. 8 may be carried out by determining which nodes closest to the network boundary between the nodes booted in serial processing mode and the nodes booted in parallel processing mode are available for processing and selecting those nodes for executing the application (158).

Deploying (816) the application (158) for execution on the parallel computer according to the method of FIG. 8 then includes configuring (830) the application (158) for execution on the selected compute nodes. In the example of FIG. 8, readers will note that the nodes selected in the parallel computer (840) are the nodes that have predefined locations in the data communications network to increase the proximity of the selected compute nodes in serial processing mode (610) and the selected compute nodes in parallel processing mode (612). That is, the selected nodes are the closest nodes available to the network boundary in the parallel computer (840) between the nodes in serial processing mode and the nodes in parallel processing mode. FIG. 8 illustrates the selected nodes in parallel computer (840) through use of the blacked squares, which represent processors on the selected nodes in a manner similar to the representation on FIG. 6.

Deploying (816) the application (158) for execution on the parallel computer according to the method of FIG. 8 includes selecting (828), if the interleave rate (820) for the application (158) does not exceed the particular threshold (822), particular compute nodes in the first subset (802) to process the application's serial segments (810) and particular compute nodes in the second subset (806) to process the application's parallel segments (812) such that the selected compute nodes have predefined locations in the data communications network to reduce the proximity of the selected compute nodes in the first subset (802) and the selected compute nodes in the second subset (806). Selecting (828) compute nodes in the first and second subset (802, 806) that have predefined locations in the data communications network to reduce the proximity of the selected compute nodes in the first subset (802) and the selected compute nodes in the second subset (806) according to the method of FIG. 8 may be carried out by determining which nodes farthest from the network boundary between the nodes booted in serial processing mode and the nodes booted in parallel processing mode are available for processing and selecting those nodes for executing the application (158).

Deploying (816) the application (158) for execution on the parallel computer according to the method of FIG. 8 then includes configuring (832) the application (158) for execution on the selected compute nodes. In the example of FIG. 8, readers will note that the nodes selected in the parallel computer (842) are the nodes that have predefined locations in the data communications network to reduce the proximity of the selected compute nodes in serial processing mode (610) and the selected compute nodes in parallel processing mode (612). That is, the selected nodes are the farthest nodes available from the network boundary in the parallel computer (842) between the nodes in serial processing mode and the nodes in parallel processing mode. FIG. 8 illustrates the selected nodes in parallel computer (842) through use of the blacked squares, which represent processors on the selected nodes in a manner similar to the representation on FIG. 7.

Exemplary embodiments of the present invention are described largely in the context of a fully functional parallel computer system for providing nearest neighbor point-to-point communications among compute nodes of an operational group in a global combining network. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of configuring an application for execution on a parallel computer, the parallel computer comprising a plurality of compute nodes connected together through a data communications network, each compute node having a plurality of processors capable of operating independently for serial processing among the processors and capable of operating symmetrically for parallel processing among the processors, the application having parallel segments designated for parallel processing and serial segments designated for serial processing, the method comprising:

profiling, prior to application deployment on the parallel computer, the application to identify the serial segments and the parallel segments of the application; and deploying the application for execution on the parallel computer in dependence upon the profile of the application and proximity within the data communications network of compute nodes in a first subset of compute nodes configured in a serial processing mode relative to compute nodes in a second subset of compute nodes configured in a parallel processing mode.

2. The method of claim 1 wherein deploying the application for execution on the parallel computer in dependence upon the profile of the application and proximity within the data communications network of the compute nodes in the first subset relative to the compute nodes in the second subset further comprises:

determining an interleave rate for the application in dependence upon the profile for the application, the interleave rate specifying the distribution of the serial segments and the parallel segments along the application's execution sequence;

determining whether the interleave rate for the application exceeds a particular threshold;

selecting, if the interleave rate for the application exceeds the particular threshold, particular compute nodes in the first subset to process the application's serial segments and particular compute nodes in the second subset to process the application's parallel segments such that the selected compute nodes have predefined locations in the data communications network to increase the proximity of the selected compute nodes in the first subset and the selected compute nodes in the second subset; and configuring the application for execution on the selected compute nodes.

3. The method of claim 1 wherein deploying the application for execution on the parallel computer in dependence upon the profile of the application and proximity within the data communications network of the compute nodes in the first subset relative to the compute nodes in the second subset further comprises:

determining an interleave rate for the application in dependence upon the profile for the application, the interleave rate specifying the distribution of the serial segments and the parallel segments along the application's execution sequence;

determining whether the interleave rate for the application does not exceed a particular threshold;

selecting, if the interleave rate for the application does not exceed the particular threshold, particular compute nodes in the first subset to process the application's serial segments and particular compute nodes in the second subset to process the application's parallel segments such that the selected compute nodes have predefined locations in the data communications network to reduce the proximity of the selected compute nodes in the first subset and the selected compute nodes in the second subset; and configuring the application for execution on the selected compute nodes.

4. The method of claim 1 wherein profiling, prior to application deployment on the parallel computer, the application to identify the serial segments and the parallel segments of the application further comprises parsing application instructions of the application for serial segments and parallel segments.

5. The method of claim 1 wherein profiling, prior to application deployment on the parallel computer, the application to identify the serial segments and the parallel segments of the application further comprises identifying the serial segments and the parallel segments of the application in dependence upon historical execution information.

6. The method of claim 1 wherein the plurality of compute nodes are connected together through a plurality of data communications networks, at least one of the data communications networks optimized for point to point data communications, at least one of the data communications networks optimized for collective operations.

7. A parallel computer for configuring an application for execution on a parallel computer, the parallel computer comprising a plurality of compute nodes connected together through a data communications network, each compute node having a plurality of processors capable of operating independently for serial processing among the processors and capable of operating symmetrically for parallel processing among the processors, the application having parallel segments designated for parallel processing and serial segments designated for serial processing, the parallel computer comprising computer memory operatively coupled to the processors of the plurality of compute nodes, the computer memory having disposed within it computer program instructions capable of:

profiling, prior to application deployment on the parallel computer, the application to identify the serial segments and the parallel segments of the application; and deploying the application for execution on the parallel computer in dependence upon the profile of the application and proximity within the data communications network of compute nodes in a first subset of compute nodes configured in a serial processing mode relative to compute nodes in a second subset of compute nodes configured in a parallel processing mode.

8. The parallel computer of claim 7 wherein deploying the application for execution on the parallel computer in dependence upon the profile of the application and proximity within the data communications network of the compute nodes in the first subset relative to the compute nodes in the second subset further comprises:

determining an interleave rate for the application in dependence upon the profile for the application, the interleave rate specifying the distribution of the serial segments and the parallel segments along the application's execution sequence;

determining whether the interleave rate for the application exceeds a particular threshold;

selecting, if the interleave rate for the application exceeds the particular threshold, particular compute nodes in the first subset to process the application's serial segments and particular compute nodes in the second subset to process the application's parallel segments such that the selected compute nodes have predefined locations in the data communications network to increase the proximity of the selected compute nodes in the first subset and the selected compute nodes in the second subset; and configuring the application for execution on the selected compute nodes.

9. The parallel computer of claim 7 wherein deploying the application for execution on the parallel computer in dependence upon the profile of the application and proximity within the data communications network of the compute nodes in the first subset relative to the compute nodes in the second subset further comprises:

determining an interleave rate for the application in dependence upon the profile for the application, the interleave rate specifying the distribution of the serial segments and the parallel segments along the application's execution sequence;

determining whether the interleave rate for the application does not exceed a particular threshold;

selecting, if the interleave rate for the application does not exceed the particular threshold, particular compute nodes in the first subset to process the application's serial segments and particular compute nodes in the second subset to process the application's parallel segments such that the selected compute nodes have predefined locations in the data communications network to reduce the proximity of the selected compute nodes in the first subset and the selected compute nodes in the second subset; and configuring the application for execution on the selected compute nodes.

10. The parallel computer of claim 7 wherein profiling, prior to application deployment on the parallel computer, the application to identify the serial segments and the parallel segments of the application further comprises:

parsing application instructions of the application for serial segments and parallel segments.

11. The parallel computer of claim 7 wherein profiling, prior to application deployment on the parallel computer, the application to identify the serial segments and the parallel segments of the application further comprises:

identifying the serial segments and the parallel segments of the application in dependence upon historical execution information.

12. The parallel computer of claim 7 wherein the plurality of compute nodes are connected together through a plurality of data communications networks, at least one of the data communications networks optimized for point to point data communications, at least one of the data communications networks optimized for collective operations.

13. A computer program product for configuring an application for execution on a parallel computer, the parallel computer comprising a plurality of compute nodes connected together through a data communications network, each compute node having a plurality of processors capable of operating independently for serial processing among the processors and capable of operating symmetrically for parallel processing among the processors, the application having parallel segments designated for parallel processing and serial segments designated for serial processing, the computer program product disposed upon a non-transitory computer readable medium, the computer program product comprising computer program instructions capable of:

profiling, prior to application deployment on the parallel computer, the application to identify the serial segments and the parallel segments of the application; and deploying the application for execution on the parallel computer in dependence upon the profile of the application and proximity within the data communications network of compute nodes in a first subset of compute nodes configured in a serial processing mode relative to compute nodes in a second subset of compute nodes configured in a parallel processing mode.

14. The computer program product of claim 13 wherein deploying the application for execution on the parallel computer in dependence upon the profile of the application and proximity within the data communications network of the compute nodes in the first subset relative to the compute nodes in the second subset further comprises:

determining an interleave rate for the application in dependence upon the profile for the application, the interleave rate specifying the distribution of the serial segments and the parallel segments along the application's execution sequence;

determining whether the interleave rate for the application exceeds a particular threshold;

selecting, if the interleave rate for the application exceeds the particular threshold, particular compute nodes in the first subset to process the application's serial segments and particular compute nodes in the second subset to process the application's parallel segments such that the selected compute nodes have predefined locations in the data communications network to increase the proximity of the selected compute nodes in the first subset and the selected compute nodes in the second subset; and configuring the application for execution on the selected compute nodes.

15. The computer program product of claim 13 wherein deploying the application for execution on the parallel computer in dependence upon the profile of the application and proximity within the data communications network of the compute nodes in the first subset relative to the compute nodes in the second subset further comprises:

determining an interleave rate for the application in dependence upon the profile for the application, the interleave rate specifying the distribution of the serial segments and the parallel segments along the application's execution sequence;

determining whether the interleave rate for the application does not exceed a particular threshold;

selecting, if the interleave rate for the application does not exceed the particular threshold, particular compute nodes in the first subset to process the application's serial segments and particular compute nodes in the second subset to process the application's parallel segments such that the selected compute nodes have predefined locations in the data communications network to reduce the proximity of the selected compute nodes in the first subset and the selected compute nodes in the second subset; and configuring the application for execution on the selected compute nodes.

16. The computer program product of claim 13 wherein profiling, prior to application deployment on the parallel computer, the application to identify the serial segments and the parallel segments of the application further comprises parsing application instructions of the application for serial segments and parallel segments.

17. The computer program product of claim 13 wherein profiling, prior to application deployment on the parallel computer, the application to identify the serial segments and the parallel segments of the application further comprises identifying the serial segments and the parallel segments of the application in dependence upon historical execution information.

18. The computer program product of claim 13 wherein the plurality of compute nodes are connected together through a plurality of data communications networks, at least one of the data communications networks optimized for point to point data communications, at least one of the data communications networks optimized for collective operations.

* * * * *